US012688429B2

(12) United States Patent　　　(10) Patent No.: US 12,688,429 B2
Guo et al.　　　　　　　　　　　(45) Date of Patent:　　　Jul. 21, 2026

---

(54) OBJECT DETECTION METHOD, MACHINE LEARNING METHOD, AND ELECTRONIC DEVICE

(71) Applicant: Wistron Corporation, New Taipei City (TW)

(72) Inventors: Jiun-In Guo, Hsinchu (TW);
Cheng-Fu Liou, Hsinchu (TW)

(73) Assignee: Wistron Corporation, New Taipei City (TW)

( * ) Notice: Subject to any disclaimer, the term of this patent is extended or adjusted under 35 U.S.C. 154(b) by 282 days.

(21) Appl. No.: 18/448,975

(22) Filed: Aug. 14, 2023

(65) Prior Publication Data

US 2024/0419972 A1　　　Dec. 19, 2024

(30) Foreign Application Priority Data

Jun. 14, 2023　　(TW) ................................. 112122263

(51) Int. Cl.
*G06N 3/084*　　　(2023.01)
*G06V 10/25*　　　(2022.01)
*G06V 10/82*　　　(2022.01)

(52) U.S. Cl.
CPC ............. *G06N 3/084* (2013.01); *G06V 10/25* (2022.01); *G06V 10/82* (2022.01); *G06V 2201/07* (2022.01)

(58) Field of Classification Search
CPC ...... G06N 3/084; G06N 3/045; G06N 3/0464; G06N 20/00; G06N 3/09; G06N 3/08; G06N 3/04; G06N 3/082; G06N 3/044;

G06N 3/0495; G06V 10/25; G06V 10/82; G06V 2201/07; G06V 10/454; G06V 10/764; G06V 20/58; G06V 10/774; G06V 10/7715; G06V 10/255; G06V 10/761;

(Continued)

(56) References Cited

U.S. PATENT DOCUMENTS

| 10,990,820 B2 * | 4/2021 | Mansour | ............... G06F 18/285 |
| 11,244,191 B2 * | 2/2022 | Yao | ......................... G06N 3/082 |

(Continued)

FOREIGN PATENT DOCUMENTS

| CN | 115775614 | 3/2023 |
| WO | 2022019913 | 1/2022 |

OTHER PUBLICATIONS

K J Joseph et al., "Incremental Object Detection via Meta-Learning", IEEE Transactions On Pattern Analysis and Machine Intelligence, Nov. 2, 2021, pp. 1-11.

(Continued)

*Primary Examiner* — Michael S Osinski
(74) *Attorney, Agent, or Firm* — JCIPRNET

(57) ABSTRACT

An object detection method includes the following steps: detecting an environment signal, determining a task mode based on the environment signal, capturing an input image, performing feature extraction on the input image through a sub-model of a neural network model according to the task mode, where the sub-model of the neural network model includes a task-specific layer corresponding to the task mode, where a polarization mask of the task-specific layer determines the sub-model of the neural network model, and outputting an object detection result corresponding to the task mode.

12 Claims, 8 Drawing Sheets

(58) Field of Classification Search

CPC .... G06V 10/806; G06V 20/52; G06T 7/0004; G06T 2207/20081; G06T 2207/30108; G06T 2207/20084; G06T 7/11; G06T 7/73; G06T 2207/10024; G06T 7/90; G06T 2207/10028; G06T 2207/20016; G06T 2210/12; G06T 3/4046; G06T 7/70; G06F 18/2431; G06F 18/24; G06F 18/24133

See application file for complete search history.

(56) References Cited

U.S. PATENT DOCUMENTS

| | | | | |
|---|---|---|---|---|
| 11,416,733 | B2* | 8/2022 | Hashemi | G06F 3/0673 |
| 11,694,422 | B2* | 7/2023 | Fang | G06T 3/4007 |
| | | | | 382/173 |
| 11,967,042 | B2* | 4/2024 | Shanmuga Vadivel | |
| | | | | G06T 3/4046 |
| 12,020,167 | B2* | 6/2024 | Sinha | G06N 3/0464 |
| 12,434,709 | B1* | 10/2025 | Goel | G06V 20/56 |
| 2017/0124415 | A1* | 5/2017 | Choi | G06V 10/25 |
| 2018/0025249 | A1* | 1/2018 | Liu | G06N 3/044 |
| | | | | 382/158 |
| 2018/0096457 | A1* | 4/2018 | Savvides | G06V 10/764 |
| 2018/0121796 | A1* | 5/2018 | Deisher | G06N 3/045 |
| 2019/0045163 | A1* | 2/2019 | Nikkanen | H04N 1/6077 |
| 2020/0160087 | A1* | 5/2020 | Redmon | G06V 10/82 |
| 2020/0311517 | A1* | 10/2020 | Raichelgauz | G06N 3/08 |
| 2021/0089841 | A1* | 3/2021 | Mithun | G06V 20/52 |
| 2021/0264557 | A1* | 8/2021 | Mao | G06T 1/20 |
| 2021/0383165 | A1* | 12/2021 | Won | G06T 7/11 |
| 2022/0108546 | A1* | 4/2022 | Xu | G06V 10/82 |
| 2022/0198707 | A1* | 6/2022 | Li | G06T 7/75 |
| 2023/0070444 | A1 | 3/2023 | Kartmann et al. | |
| 2023/0077332 | A1* | 3/2023 | Sano | G06V 10/22 |
| | | | | 382/149 |
| 2023/0111375 | A1* | 4/2023 | Clemons | G06N 3/08 |
| | | | | 706/15 |
| 2023/0186586 | A1* | 6/2023 | Yoo | G06N 3/0464 |
| | | | | 382/100 |
| 2023/0259758 | A1* | 8/2023 | Zhang | G06N 3/0464 |
| | | | | 706/25 |
| 2023/0267307 | A1* | 8/2023 | Wang | G06N 3/045 |
| | | | | 706/25 |
| 2023/0401838 | A1* | 12/2023 | Chen | G06V 10/7715 |
| 2024/0161461 | A1* | 5/2024 | Zu | G06V 10/82 |
| 2024/0412444 | A1* | 12/2024 | Philip | G06T 7/70 |
| 2025/0013463 | A1* | 1/2025 | Li | G06F 8/73 |

OTHER PUBLICATIONS

K J Joseph et al., "Towards Open World Object Detection", 2021 IEEE/CVF Conference on Computer Vision and Pattern Recognition (CVPR), Jun. 20-25, 2021, pp. 5830-5840.

* cited by examiner

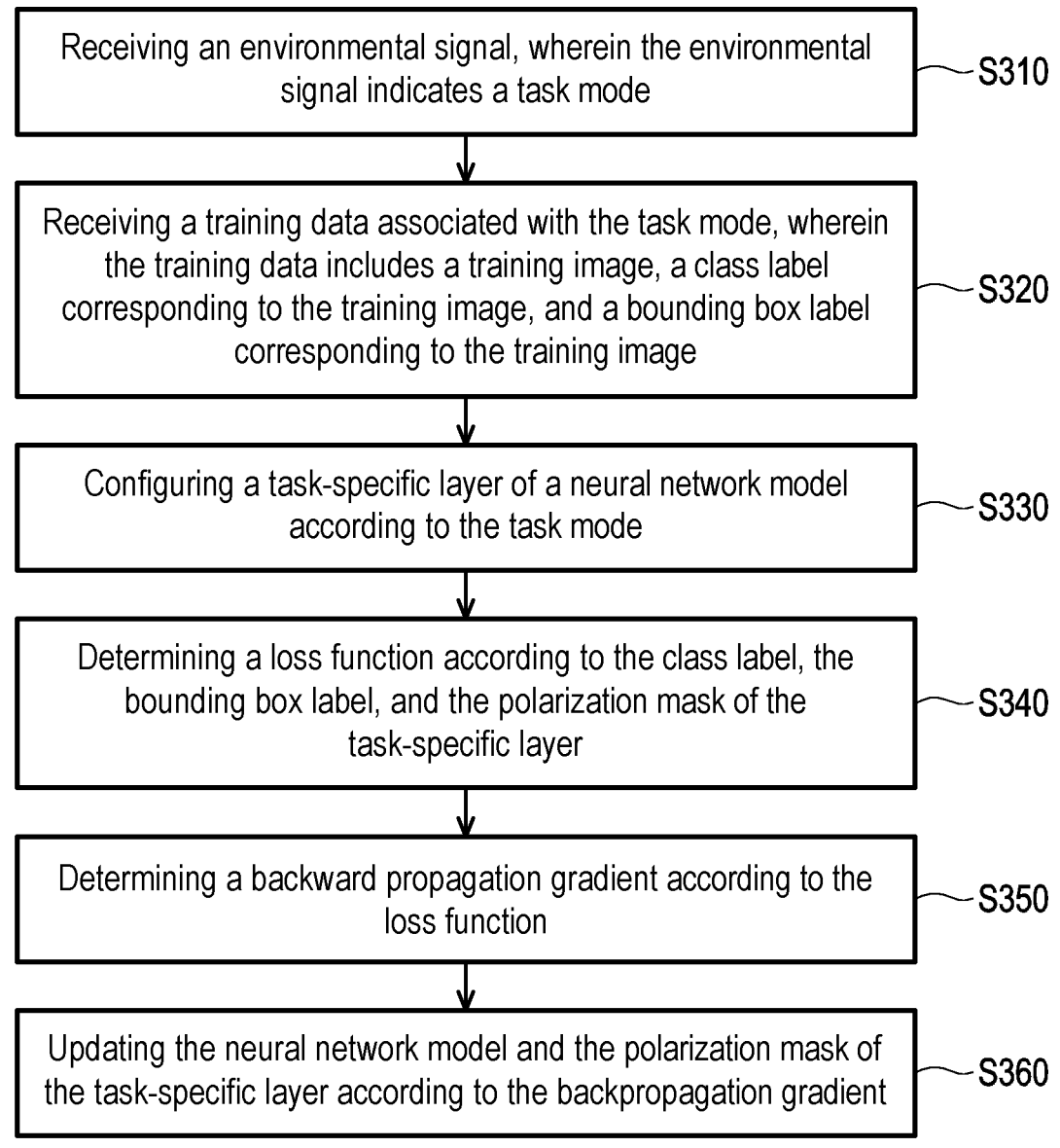

Receiving an environmental signal, wherein the environmental signal indicates a task mode — S310

Receiving a training data associated with the task mode, wherein the training data includes a training image, a class label corresponding to the training image, and a bounding box label corresponding to the training image — S320

Configuring a task-specific layer of a neural network model according to the task mode — S330

Determining a loss function according to the class label, the bounding box label, and the polarization mask of the task-specific layer — S340

Determining a backward propagation gradient according to the loss function — S350

Updating the neural network model and the polarization mask of the task-specific layer according to the backpropagation gradient — S360

FIG. 3

OBJECT DETECTION METHOD, MACHINE LEARNING METHOD, AND ELECTRONIC DEVICE

CROSS-REFERENCE TO RELATED APPLICATION

This application claims the priority benefit of Taiwan application serial no. 112122263, filed on Jun. 14, 2023. The entirety of the above-mentioned patent application is hereby incorporated by reference herein and made a part of this specification.

BACKGROUND

Technical Field

The disclosure relates to continual learning in object detection technology, and in particular to an object detection method, a machine learning method and an electronic device.

Description of Related Art

The goal of traditional object detection is to develop computational models and techniques that provide the information needed for computer vision applications, including object location and class (such as people, animals, or cars). In the past two decades, the development of object detection has gone through two main phases: "traditional object detection era" (before 2014) and "deep learning-based detection era" (after 2014). Early object detection algorithms were mainly based on human-designed complex features and employed various acceleration techniques to utilize limited computing resources. With the major breakthroughs in deep learning technology after 2014, object detection has become a prominent research hotspot. In recent years, the field of continual learning for one-stage and two-stage object detection has gained increasing attention due to the wide application of object detection in robotics and autonomous vehicles.

Continual learning is a vital objective in artificial intelligence research. The focus of continual learning is to enable a model to learn the knowledge of different tasks at different time points while not forgetting the previously acquired knowledge, namely, avoiding the problem known as "catastrophic forgetting" in neural networks. Continual learning not only improves the efficiency of learning new knowledge but also reduces the hardware requirements of training equipment because it is not necessary to access the data of old tasks. Task incremental learning is a typical scenario in continual learning. In this scenario, the data of the same task all arrive at the same time point so that the model can be trained under the assumption of an independent and identical distribution data.

In other words, continual learning aims to classify the features of task labels collected at different time points such that the feature spaces corresponding to different tasks do not intersect each other. Catastrophic forgetting is avoided no matter how many tasks or classes are added in the context of continual learning.

Existing object detection technologies only develop algorithms for specific network architectures, and their architectures may not be applicable to various object detectors. In existing object detection technologies, the flexibility of neural networks and generalization on training images are not desirable and may not be able to reduce the burden on users. Moreover, conventional task incremental learning research mainly focuses on two-stage object detectors rather than single-stage object detectors which are faster in practical application scenarios.

Therefore, how to share a neural network model of the same single-stage object detector for multiple tasks so that the overall network size and computational burden can be reduced, and avoiding catastrophic forgetting without the need to retrieve and store old task data, are subjects of concern to those skilled in the art.

SUMMARY

Accordingly, the disclosure provides an object detection method, a machine learning method, and an electronic device. Based on the network architecture of a single-stage object detector, the disclosure introduces an object detection technique that enables task incremental learning without the need to prune the original network layer architecture. The disclosure is suitable for extensive applications in various single-stage object detection models and effectively mitigates the problem of catastrophic forgetting.

An embodiment of the disclosure provides an object detection method, including the following steps: detecting an environment signal; determining a task mode according to the environment signal; capturing an input image; performing feature extraction on the input image according to the task mode through a sub-model of a neural network model, wherein the sub-model of the neural network model comprising a task-specific layer corresponding to the task mode, and a polarization mask of the task-specific layer determines the sub-model of the neural network model; and outputting an object detection result corresponding to the task mode.

An embodiment of the disclosure provides a machine learning method, including the following steps: receiving an environment signal, wherein the environment signal indicates a task mode; receiving a training data associated with the task mode, wherein the training data comprising a training image, a class label corresponding to the training image and a bounding box label corresponding to the training image; configuring a task-specific layer of a neural network model, wherein a polarization mask of the task-specific layer determines a sub-model of the neural network model; determining a loss function according to the class label, the bounding box label and the polarization mask of the task-specific layer; determining a backpropagation gradient according to the loss function; and updating the neural network model and the polarization mask of the task-specific layer according to the backpropagation gradient.

An embodiment of the disclosure provides an electronic device which includes a storage medium and a processor. The storage medium stores a plurality of modules. The processor is coupled to the storage medium and is configured to execute the modules. The modules include an environment perception module, an image capturing module and an inference module. The environment perception module detects an environment signal. The image capturing module captures an input image. The inference module determines a task mode according to the environment signal. The inference module performs feature extraction on the input image according to the task mode through a sub-model of a neural network model, wherein the sub-model of the neural network model comprising a task-specific layer corresponding to the task mode, and a polarization mask of the task-specific layer determines the sub-model of the neural network model. The inference module outputs an object detection result corresponding to the task mode.

Based on the above, the embodiments of the disclosure provide a task-incremental learning technique for single-stage object detectors. The architecture according to embodiments of the disclosure enables the determination of different sub-models by corresponding a neural network model to the crucial convolutional neural network parameters of different task modes through a task-specific layer. Additionally, the architecture according to embodiments of the disclosure allows for combination of a neural network model with a polarization mask of the learned task to automatically determine whether to reuse the neural network parameters that are important for other old tasks and utilizes these parameters to optimize the new task according to a loss function such that the reusability of the neural network model can be enhanced. As a result, the single-stage object detection model effectively avoids catastrophic forgetting in both classification and object localization.

BRIEF DESCRIPTION OF THE DRAWINGS

The accompanying drawings are included to provide a further understanding of the disclosure and are incorporated in and constitute a part of this specification. The drawings illustrate exemplary embodiments of the disclosure and, together with the description, serve to explain the principles of the disclosure.

FIG. 3 is a flowchart of a machine learning method according to an embodiment of the disclosure.

DESCRIPTION OF THE EMBODIMENTS

Figure 1:
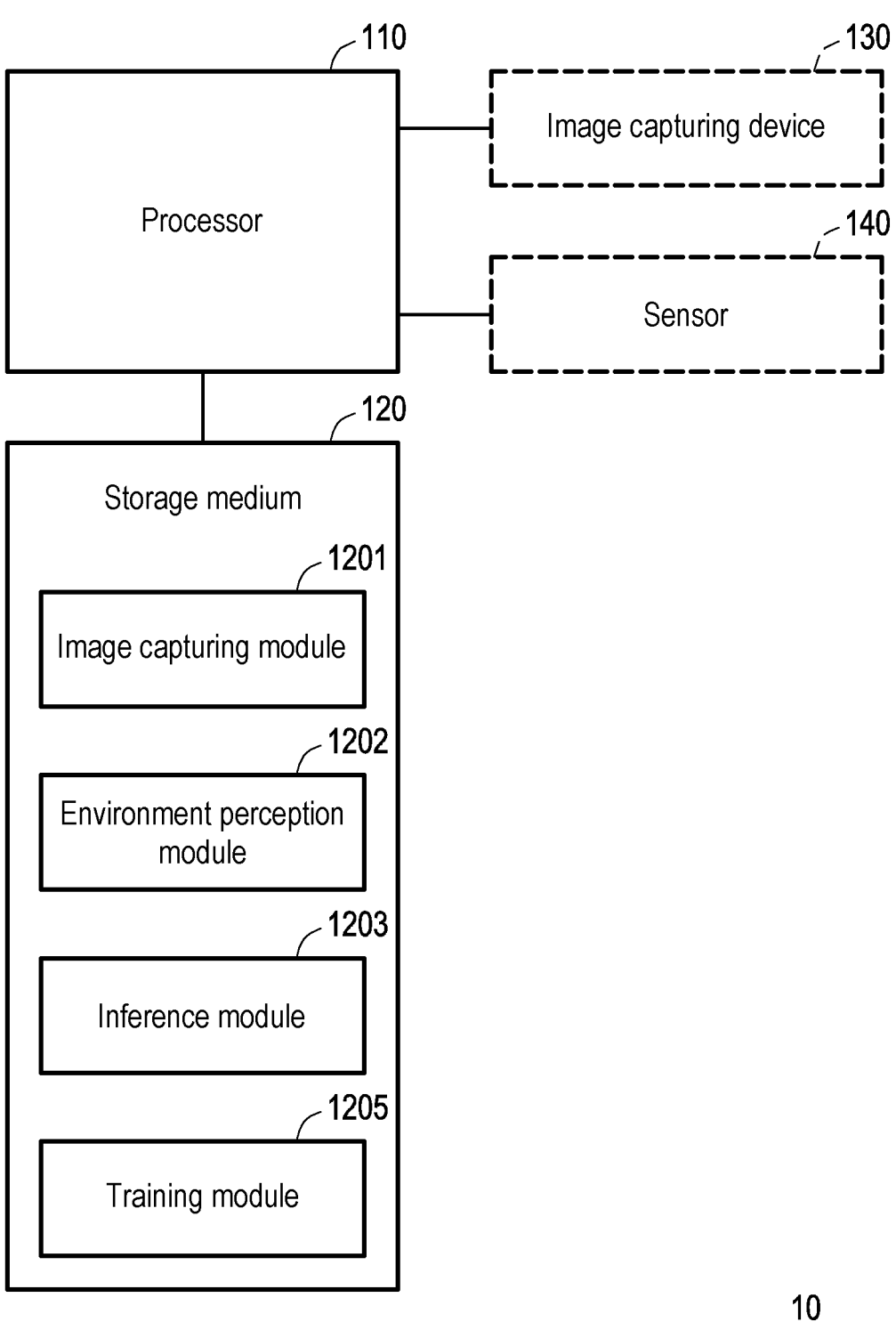
FIG. 1 is a schematic view of an electronic device according to an embodiment of the disclosure.

Some embodiments of the disclosure accompanied with the drawings will now be described in detail. For the reference numerals recited in description below, the same reference numerals shown in different drawings will be regarded as the same or similar elements. These embodiments are only a part of the disclosure, and do not disclose all the possible implementations of the disclosure. To be more precise, these embodiments are only examples of the appended claims of the disclosure. Wherever possible, elements/components/steps with the same reference numerals in the drawings and embodiments represent the same or similar parts. Cross-reference may be made between the elements/components/steps in different embodiments that are denoted by the same reference numerals or that have the same names.

FIG. 1 is a schematic view of an electronic device according to an embodiment of the disclosure. The electronic device 10 includes a processor 110 and a storage medium 120.

The electronic device 10 may be an edge computing device implemented on an embedded platform. In the embodiment of the disclosure, the electronic device 10 may be a drone. In some embodiments, the electronic device 10 may also be a device applied to various application scenarios such as image recognition, access control management, identity verification, digital monitoring, financial industry, retail industry, unmanned store, smart factory, mechanical surgery or medical diagnosis, etc. In some embodiments, the electronic device 10 may also be a desktop computer, a notebook computer, a server, a smart phone or a tablet computer.

The processor 110 is, for example, a central processing unit (CPU), or other programmable general purpose or special purpose micro control unit (MCU), microprocessor, digital signal processor (DSP), programmable controller, application specific integrated circuit (ASIC), graphics processing unit (GPU), tensor processing unit (TPU), image signal processor (ISP), image processing unit (IPU), arithmetic logic unit (ALU), complex programmable logic device (CPLD), field programmable logic gate array (FPGA) or other similar components or a combination of the above components. The processor 110 is coupled to the storage medium 120, and accesses and executes multiple modules or various application programs stored in the storage medium 120.

The storage medium 120 is, for example, any type of fixed or movable random access memory (RAM), read-only memory (ROM), flash memory, hard disk drive (HDD), solid state drive (SSD), or similar components or a combination of the above components and is configured to store a plurality of modules, computer programs, or various application programs executable by the processor 110. In this embodiment, the modules stored in the storage medium 120 include an image capturing module 1201, an environment perception module 1202, an inference module 1203 and a training module 1205, the functions of which are described below.

In one embodiment, the electronic device 10 may further include an image capturing device 130. The processor 110 may be coupled to the image capturing device 130. The image capturing device 130 is, for example, a digital camera, a video camera, or a camera lens with a lens and a photosensitive element. The photosensitive element is used to sense the intensity of the light entering the lens to generate an image.

In one embodiment, the electronic device 10 may further include a sensor 140. The processor 110 may be coupled to the sensor 140. The sensor 140 may detect the environment of the electronic device 10 to generate an environment signal. The processor 110 may receive the environment signal to determine the status of the electronic device 10 relative to the environment according to the environment signal. In one embodiment, the sensor 140 is a photosensitive sensor capable of detecting the brightness of the environment. In one embodiment, the sensor 140 is a depth sensor, which may calculate the depth of field of the environment where the electronic device 10 is located. In one embodiment, the sensor 140 is an altitude sensor, including a gyroscope, an accelerometer, a magnetometer and/or a barometer. The height of electronic device 10 in the located environment may be determined by signals from the gyroscope, the accelerometer, the magnetometer and/or the barometer.

Figure 2:
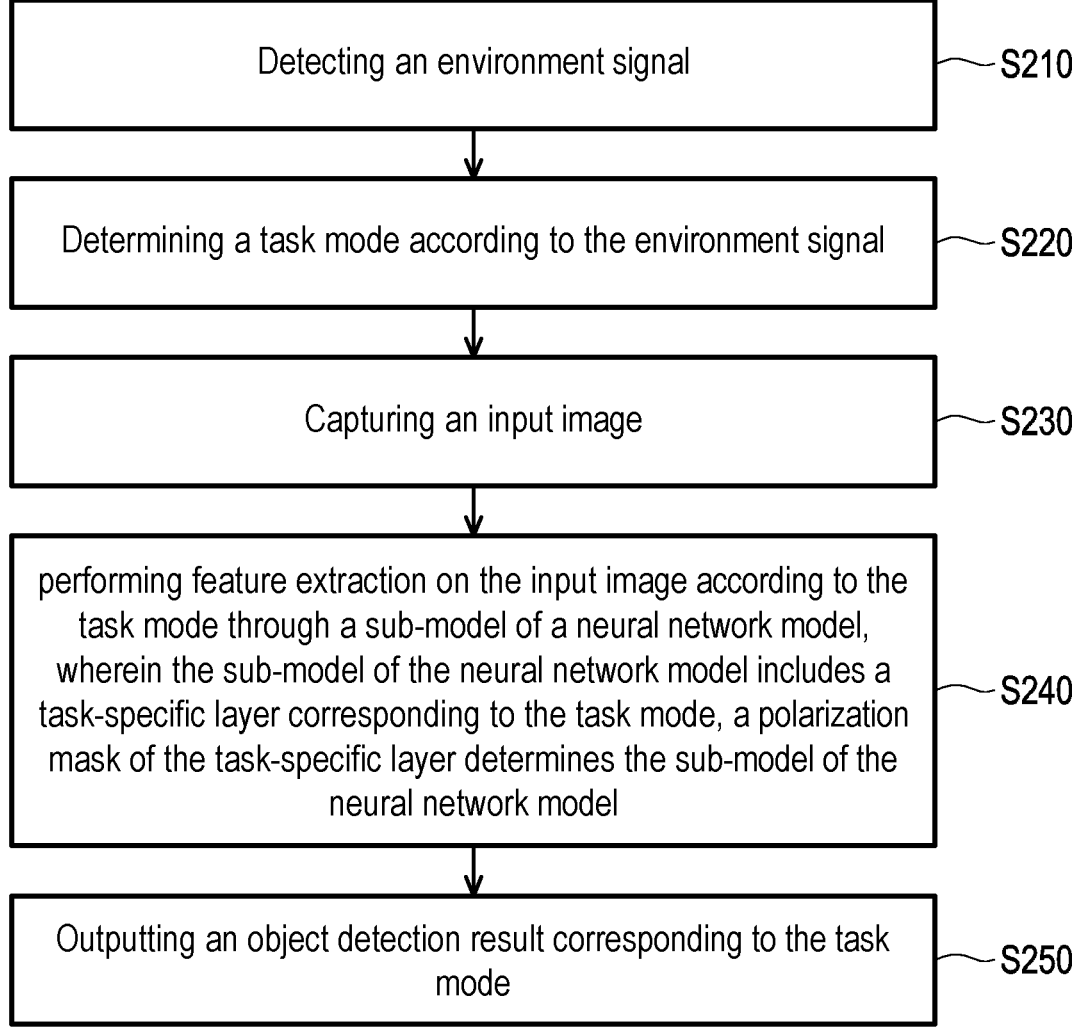
FIG. 2 is a flowchart of an object detection method according to an embodiment of the disclosure.

FIG. 2 is a flowchart of an object detection method according to an embodiment of the disclosure. The object detection method shown in FIG. 2 is applicable to electronic device 10 shown in FIG. 1. Please refer to both FIG. 1 and FIG. 2.

In step S210, the environment perception module 1202 detects an environment signal through the sensor 140.

In step S220, the inference module 1203 determines a task mode according to the environment signal. In one embodiment, the task mode is, for example, a day mode and/or night mode that may be switched according to the brightness of the environment. In one embodiment, the task modes may include, for example, different task modes switched according to the depth of field setting of the image capturing device 130. In one embodiment, the task modes may be, for example, different task modes switched according to the height of the electronic device 10 in the environment.

In step S230, the image capturing module 1201 captures an input image. For example, the image capturing module 1201 may capture an input image through the image capturing device 130. The image capturing module 1201 may also capture an input image from a database. Alternatively, the image capturing module 1201 may receive an input image through a network.

In step S240, the inference module 1203 performs feature extraction on the input image according to the task mode through a sub-model of the neural network model, wherein the sub-model of the neural network model comprising a task-specific layer corresponding to the task mode, and a polarization mask of the task-specific layer determines the sub-model of the neural network model.

In step S250, the inference module 1203 outputs the object detection result corresponding to the task mode.

FIG. 3 is a flowchart of a machine learning method according to an embodiment of the disclosure. The machine learning method shown in FIG. 3 is suitable for training a neural network model for single-stage object detection.

In step S310, the environment perception module 1202 receives an environment signal, wherein the environment signal indicates a task mode.

In step S320, the training module 1205 receives a training data associated with the task mode, wherein the training data includes a training image, a class label corresponding to the training image, and a bounding box label corresponding to the training image.

In step S330, the training module 1205 configures a task-specific layer of a neural network model according to the task mode.

In step S340, the training module 1205 determines a loss function according to the class label, the bounding box label, and the polarization mask of the task-specific layer.

In step S350, the training module 1205 determines a backpropagation gradient according to the loss function.

In step S360, the training module 1205 updates the neural network model and the polarization mask of the task-specific layer according to the backpropagation gradient.

Figure 4:
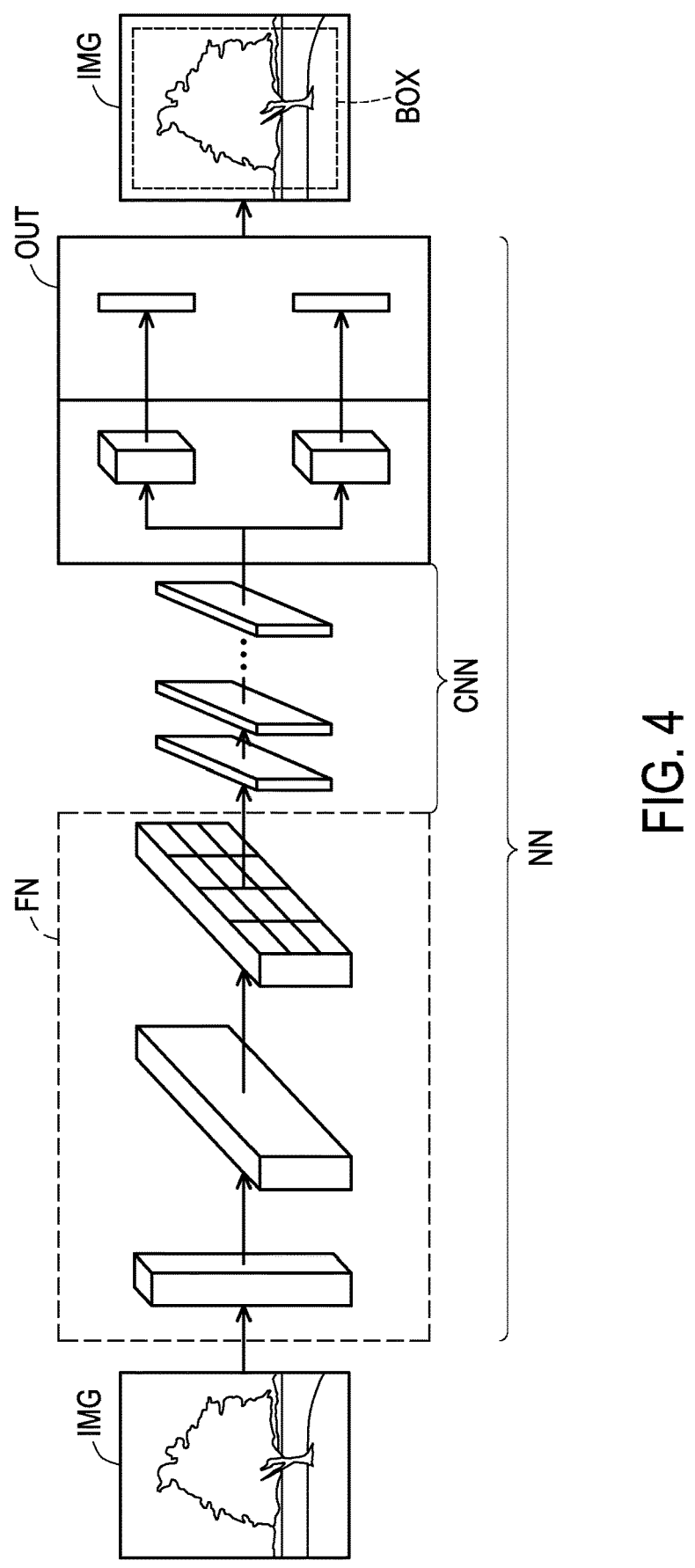
FIG. 4 a schematic view of a neural network model of YOLO object detection architecture in an embodiment of the disclosure.

FIG. 4 is a schematic view of the neural network model of the YOLO object detection model architecture in an embodiment of the disclosure. In the embodiment of the disclosure, the neural network model NN includes a feature extraction network FN and a head network. The head network includes an output layer OUT. The input image IMG passes through the feature extraction network FN to obtain an input feature map. The output layer OUT of the head network may output object detection results for the input feature map. Specifically, the input feature map is passed through the output layer OUT of the head network to obtain the predicted class of the input image IMG and the bounding box BOX of the input image IMG as the object detection result. In one embodiment, the input image IMG is extracted through the feature extraction network FN to obtain an input feature map. The input feature map is passed through multiple convolutional layers CNN, and the output feature map is obtained. The output feature map is then passed through the output layer OUT of the head network to obtain the prediction class of the input image IMG and the bounding box BOX of the input image IMG.

In an embodiment, the neural network model NN may include a convolutional neural network architecture. In one embodiment, the neural network model NN may include a convolutional layer and a batch normalization layer. In one embodiment, the neural network model NN is a YOLOR model.

In an embodiment of the disclosure, the polarization mask of the task-specific layer includes scaling factors of a batch normalization layer of the feature extraction network FN, and the scaling factors are associated with convolutional kernels of a convolutional layer of the feature extraction network FN. In an embodiment, the inference module 1203 passes the input image IMG through the convolutional layer and performs normalization calculation based on the scaling factors of the batch normalization layer to obtain the input feature map.

In YOLOR network architecture, each convolutional layer is followed by a batch normalization layer, and the number of output channels of each convolutional layer matches the number of channels of the batch normalization layer. In YOLOR network architecture, the scaling factors in the batch normalization layer can serve as the polarization mask of the convolution parameters. When a convolution parameter is beneficial to reduce the loss in the training task, a scaling factor is activated. The scaling factor enables the corresponding convolution parameter to perform forward propagation. The scaling factor in the batch normalization layer is used to measure the importance of each convolutional kernel in the convolutional layer. The scaling factor has the function of scaling (that is, the function of scalar multiplication) the feature map transmitted from the convolutional layer. When the backpropagation gradient modifies the neuron parameters of the neural network model NN, the scaling factor corresponding to each convolutional kernel will be activated. In this way, for different tasks, configuration of multiple scaling factors of the batch normalization layer as polarization mask of the task-specific layer allows the neural network model NN to preserve the significant neuron parameters without changing the architecture of the object detector during the training procedure.

In an embodiment of the disclosure, the feature extraction network FN includes a backbone network and a neck network. In one embodiment, the inference module 1203 may pass the input image through the backbone network to obtain a first feature map. In one embodiment, the processor 110 may pass the first feature map through the neck network to obtain a second feature map that integrates fusion information of different sizes. In an embodiment, the neck network may include multiple feature pyramid networks (FPN), such as the feature pyramid network FPN-1, . . . , FPN-N shown in FIG. 5. Specifically, the neck network may use the feature extraction capability of the feature pyramid network FPN-1, . . . , FPN-N to fuse the different size information of the first feature map to obtain the second feature map.

In one embodiment, the inference module 1203 passes the second feature map through the neck network to obtain the input feature map. In one embodiment, the inference module 1203 extracts the output feature map from the input feature map through the head network, and the output feature map is passed through multiple output layers OUT of the head network to obtain a predicted class and a bounding box BOX of the input image IMG.

Taking the input image IMG of FIG. 4 as an example, the input image IMG may be, for example, an image including a tree. After the inference module 1203 performs object detection on the input image IMG, the object detection result includes the prediction class of the "tree" object, the confidence value corresponding to the "tree" object, and the bounding box BOX used to mark the "tree" object.

In an embodiment of the disclosure, the polarization mask of the task-specific layer includes a plurality of first scaling factors of a first batch normalization layer of the backbone network and a plurality of second scaling factors of a second batch normalization layer of the neck network, wherein the plurality of first scaling factors are associated with a plurality of first convolutional kernels in a first convolutional layer of the backbone network, wherein the plurality of second scaling factors are associated with a plurality of second convolutional kernels in a second convolutional layer of the neck network. In one embodiment, the inference module 1203 the input image through the first convolutional layer and obtaining the first feature map by performing normalization calculation based on the plurality of first scaling factors of the first batch normalization layer. In one embodiment, the inference module 1203 passing the first feature map through the second convolutional layer and obtaining the input feature map by performing normalization calculation based on the plurality of second scaling factors of the second batch normalization layer.

In one embodiment of the disclosure, the head network includes a third batch normalization layer and a plurality of output layers, wherein the polarization mask of the task-specific layer comprising a plurality of scaling factors of the third batch normalization layer, wherein the plurality of third scaling factors are associated with a plurality of third convolutional kernels in a third convolutional layer of the third batch normalization layer. In one embodiment, the inference module 1203 passes the input feature map through the third convolutional layer and obtaining an output feature map by performing normalization calculation based on the plurality of third scaling factors of the third batch normalization layer. In one embodiment, the inference module 1203 passes the output feature map through the plurality of output layers to obtain the prediction class and the bounding box.

It should be noted that a general single-stage object detection model, such as the YOLOR model, includes three complete parts: the backbone network, the neck network, and the head network. Therefore, the polarization mask of the task-specific layer is configured for the backbone network, the neck network and the head network, respectively.

Figure 5:
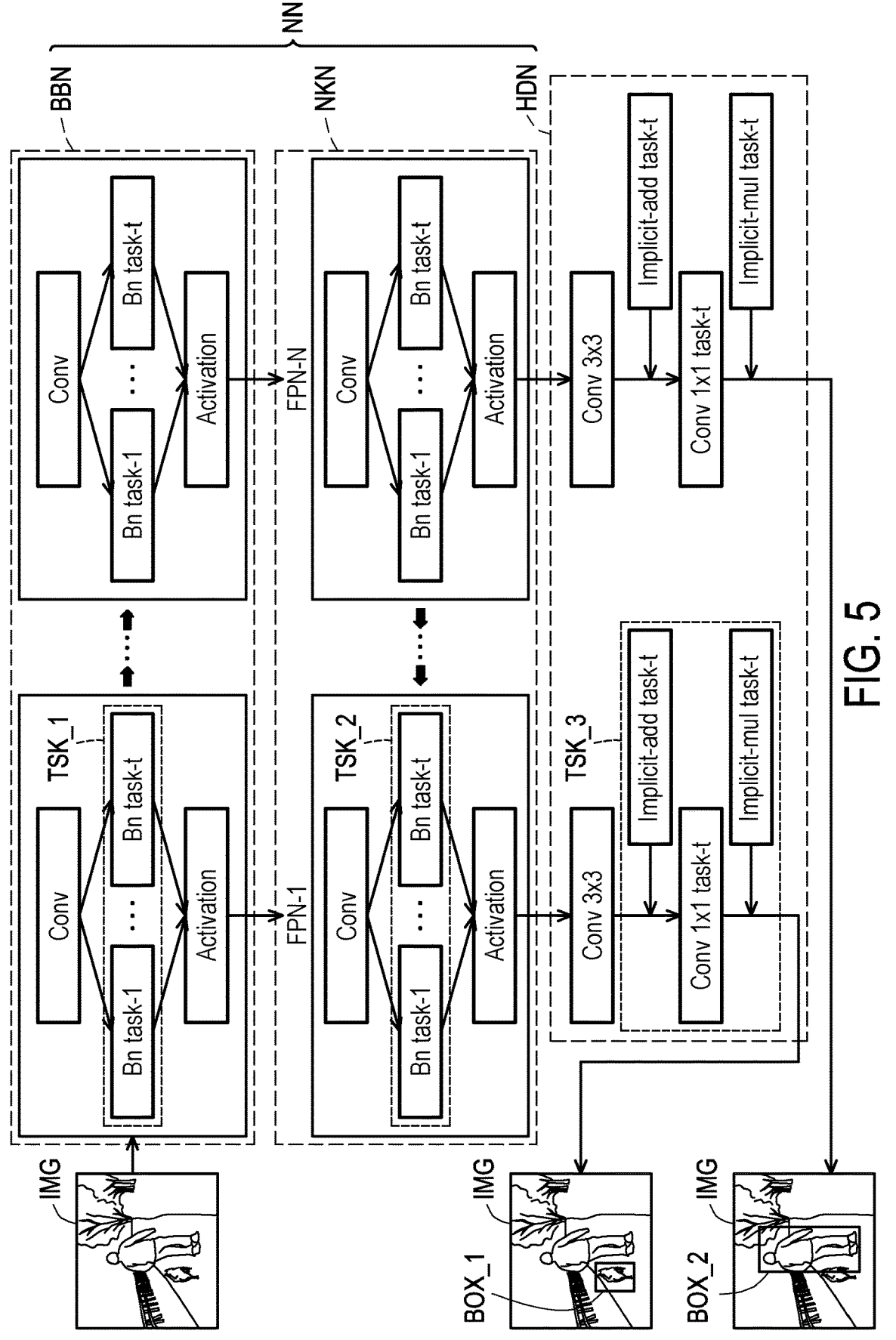
FIG. 5 is a schematic view of task-specific layers in a neural network model according to an embodiment of the disclosure.

FIG. 5 is a schematic view of task-specific layers of a neural network model according to an embodiment of the disclosure. The neural network model NN includes a backbone network BBN, a neck network NKN and a head network HDN. For a task t, the backbone network BBN, the neck network NKN and the head network HDN are respectively configured with task-specific layers TSK_1, TSK_2, and TSK_3.

In an embodiment of the disclosure, the polarization mask of the task-specific layer TSK_1 includes a plurality of first scaling factors of a first batch normalization layer (Bn task-t) of the backbone network BBN. The polarization mask of the task-specific layer TSK_2 includes a plurality of second scaling factors of a second batch normalization layer (Bn task-t) of the neck network NKN. The first scaling factors are associated with a plurality of first convolutional kernels of a first convolutional layer of the backbone network BBN. The second scaling factors are associated with second convolutional kernels of a second convolutional layer of the neck network NKN. In one embodiment, the inference module 1203 passes the input image IMG through the first convolutional layer and performs normalization calculation based on the first scaling factors of the first batch normalization layer to obtain the first feature map. In one embodiment, the inference module 1203 passes the first feature map through the second convolutional layer and performs normalization calculation based on the second scaling factors of the second batch normalization layer to obtain the input feature map. It should be noted that, as shown in FIG. 5, multiple tasks (such as task 1 to task t) are respectively configured from batch normalization layer (Bn task-1) to batch normalization layer (Bn task-t).

In an embodiment of the disclosure, the head network HDN includes a plurality of output layers, wherein the polarization mask of the task-specific layer TSK_3 includes a plurality of third scaling factors of the third batch normalization layer. The third scaling factors are associated with third convolutional kernels of a third convolutional layer of the head network HDN. In one embodiment, the inference module 1203 passes the input feature map through the third convolutional layer and performs normalization calculation based on the third scaling factors of the third batch normalization layer to obtain an output feature map. In one embodiment, the task-specific layer TSK_3 may further include a plurality of output layers, such as an implicit addition layer (implicit-add), an implicit multiplication layer (implicit-mul), and a convolutional layer (Conv 1×1) of the YOLOR architecture. In one embodiment, the inference module 1203 passes the output feature map through multiple output layers to obtain the prediction class and the bounding box. For example, in FIG. 5, the input image IMG is, for example, an image including a dog and a person. Specifically, the inference module 1203 performs object detection on the input image IMG to detect objects including "dog" and "person" in the input image IMG. In other words, in this example, the inference module 1203 passes the output feature map through multiple output layers of the head network HDN to obtain the object detection result including: the prediction class of the object "dog" and the corresponding confidence value of the object "dog", the bounding box BOX_1 used to mark the "dog" object; the prediction class of the "person" object and the corresponding confidence value of the "person" object, and the bounding box BOX_2 used to mark the "person" object.

It should be noted that for a task t (as shown in FIG. 5 as task-t), the task-specific layer TSK_3 is configured with multiple output layers corresponding to task t, namely the implicit-add task-t layer, implicit-mul task-t layer, and Conv 1×1 task-t convolutional layer. Regarding the head network of YOLOR network architecture, not all convolutional layers are followed by batch normalization layers. Therefore, when setting up task-specific layers for individual tasks in the head network of the YOLOR architecture, the multiple output layers (i.e., implicit-add task-t layer, implicit-mul task-t layer, and Conv 1×1 convolutional layer) of the head network of YOLOR architecture should be configured with corresponding task-specific layers. It is worth mentioning that, unlike 3×3 convolutional kernels, the multiple output layers are one-dimensional neural network layers with few parameters. Therefore, when learning a new task, only "12" layers are added to the neural network model, which is the product of the dimension of "4" scales of scalar receptive fields and "3" task-specific layers. This only accounts for less than "1%" of the total model parameters and incurs a very low cost. This allows the task-specific layers to record the data distribution of each different task. Even when continuously learning new tasks, the same neural network model NN can be used to infer task labels for input images IMG, achieving the capability of learning new tasks without forgetting the old tasks.

In the following, it is described in detail the parameter updating of the neural network model NN and the polarization mask of the task-specific layers during the training process.

Figure 6A:
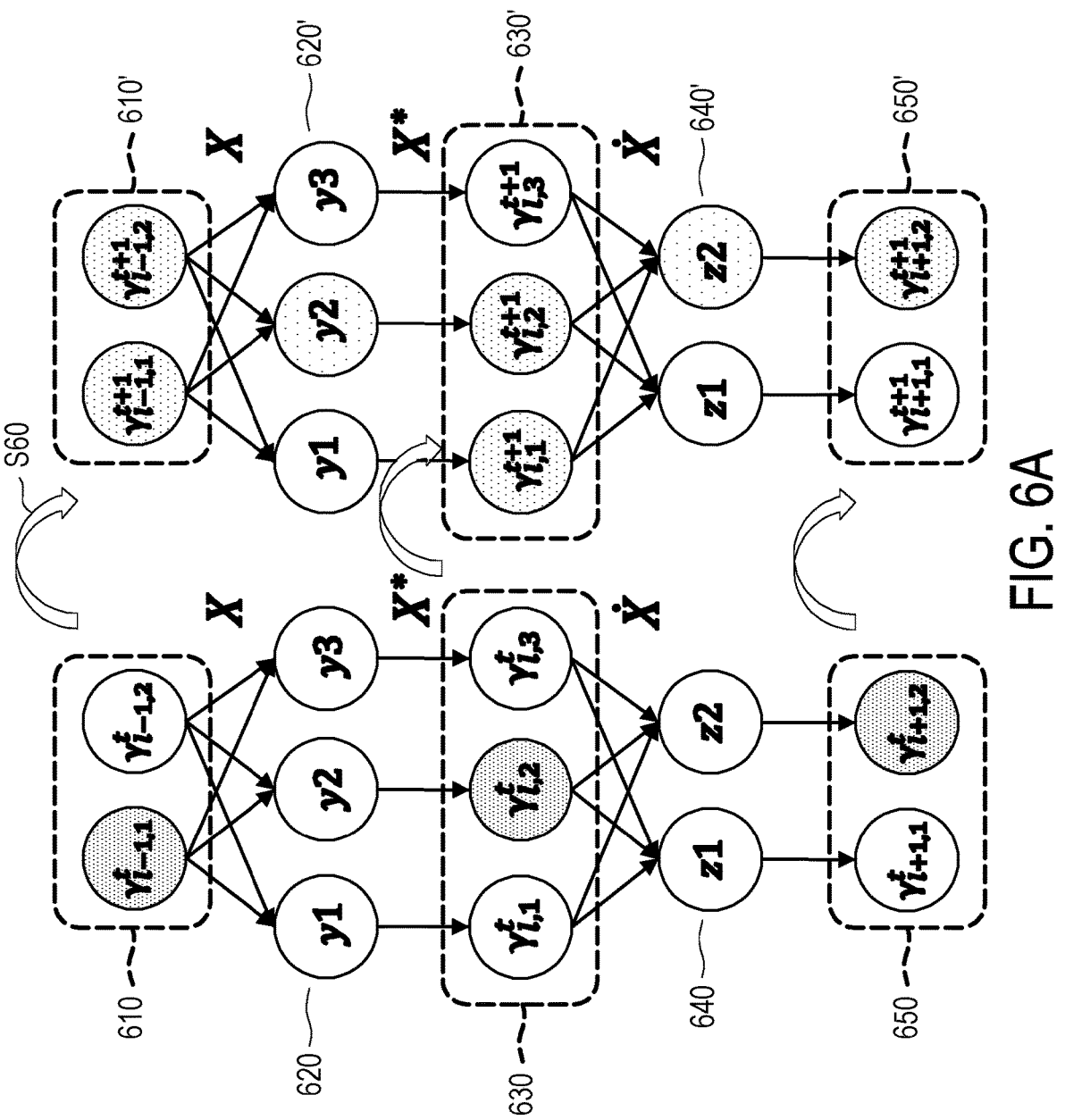
FIG. 6A is a schematic view of training a neural network model according to an embodiment of the disclosure.

FIG. 6A is a schematic view of training a neural network model in an embodiment of the disclosure. As shown in FIG. 6A, the neural network model NN includes batch normalization layers 610, 630, 650 and convolutional layers 620, 640. For example, suppose that the neural network model NN model has been trained for t tasks. For the input data X, the feature map X* is obtained by performing feature extraction through the convolutional layer 620, and then the normalization calculation is performed through the batch normalization layer 630 to obtain the feature map Ẋ.

Taking the batch normalization layer 630 as an example, the normalization calculation can be calculated by the following formula (1):

$$\dot{X} = \gamma_i^t \times \left( (X^* - \mu_i^t)/\sigma_i^t \right) + \beta_i^t \tag{1}$$

Ẋ represents the standardized feature map. X* represents the feature map after the convolutional layer.

$$\gamma_i^t$$

represents the scaling factor.

$$\mu_i^t$$

represents an average value.

$$\sigma_i^t$$

represents a standard deviation.

$$\beta_i^t$$

represents a shifting factor.

In formula (1), the variable l=1, . . . , L−1 represents a convolutional layer, L is a positive integer, and the variable t represents the current task.

$$\mu_i^t$$

is the average value of input feature maps of different channels in a batch, and $$\sigma_i^t$$

is the input of different channels in the batch. The standard deviation of feature maps, scaling factor $$\gamma_i^t$$

and shifting factor $$\beta_i^t$$

are parameters that can be trained. In one embodiment, the initial value of $$\gamma_i^t$$

is set to "0.5", and the initial value of $$\beta_i^t$$

is set to "0". The scaling factor $$\gamma_i^t$$

has the function of scaling the feature map passed from the convolutional layer.

In one embodiment of the disclosure, the polarization mask of the task-specific layer includes a plurality of scaling factors $$\gamma_i^t$$

of a batch normalization layer of the neural network model NN, and the scaling factors $$\gamma_i^t$$

are associated with convolutional kernels of a convolutional layer of the neural network model NN. Specifically, the scaling factor $$\gamma_i^t$$

in the batch normalization layer can be used to weigh the importance of the corresponding convolutional kernel in the convolutional layer. In the embodiment of the disclosure, a task-specific layer is correspondingly configured for each new task to be learned, and the batch normalization layer of the task-specific layer can save the data distribution $$(\mu_i^t \text{ and } \sigma_i^t)$$

of a specific task t, and use the corresponding scaling factor $$\gamma_i^t$$

of task t to record positions of important convolutional kernels for a target task.

Concretely, the scaling factor $$\gamma_i^t$$

in the batch normalization layer can be used to weigh the importance of the corresponding convolutional kernel in the convolutional layer. In the embodiment of the disclosure, a specific batch normalization layer (task-specific layer) is set up for each task to be learned. Each task uses a corresponding batch normalization layer to remember the data distribution $$(\mu_i^t \text{ and } \sigma_i^t)$$

of a specific task and uses the scaling factor $$\gamma_i^t$$

of the corresponding task t to record the positions of several important convolutional kernels for the target task.

Specifically, the convolutional kernels of each convolutional layer have the corresponding scaling factors $$\gamma_i^t$$

in the dimension of the number of channels to represent the importance of the convolutional kernels in the convolutional layer. In an embodiment, the number of the scaling factors $$\gamma_i^t$$

corresponds to the number of channels of the feature map X*. Since the scaling factors $$\gamma_i^t$$

may scale up or down the feature map X*, the scaling factors $$\gamma_i^t$$

may serve to limit some calculations on the neural network model NN by the channel-wise masks. In an embodiment, if the scaling factor $$\gamma_i^t$$

is not equal to "0", it indicates that the feature map in the corresponding channel needs to participate in the calculation, so the feature map goes through the batch normalization layer to the next layer. On the contrary, if the scaling factor $$\gamma_i^t$$

is equal to "0", it indicates that the feature map in the corresponding channel is not important, and it is not necessary to pass the feature map corresponding to this channel through the next layer.

That is, the scaling factor $$\gamma_i^t$$

may determine whether to activate neurons in the neural network model NN for a target task. Taking FIG. 6A as an example, for the current task t, the neurons corresponding to the scaling factors $$\gamma_{i-1,1}^t, \gamma_{i,2}^t,$$

and $$\gamma_{i+1,2}^t$$

in the batch normalization layers 610, 630, and 650 are activated, and the feature map corresponding to this channel is put to the next layer.

After step S60, for the given feature map X of the new task t+1, note that the training module 1205 replaces the batch normalization layers with new batch normalization layers 610', 630', and 650'. However, convolutional layers 620' and 640' are the same as the original convolutional layers 620 and 640 to perform the steps in the training process. As shown in FIG. 6A, for the new task t+1, the neurons corresponding to the scaling factors $$\gamma_{i-1,1}^{t+1}, \gamma_{i-1,2}^{t+1}, \gamma_{i,1}^{t+1}, \gamma_{i,2}^{t+1},$$

and $$\gamma_{i+1,2}^{t+1}$$

in the new batch normalization layers 610', 630', and 650' are activated, so that the feature maps corresponding to this channel are passed to the next layer.

Next, the training module 1205 determines a loss function $\hat{L}$ according to a class label, a bounding box label, and the polarization mask of the task-specific layer. The training module 1205 uses the loss function $\hat{L}$ to update the neural network model NN and the polarization mask of the task-specific layer by backward gradient propagation.

In an embodiment of the disclosure, the loss function $\hat{L}$ includes a cross entropy loss and a layer-wise polarization regularization term.

In one embodiment, the loss function $\hat{L}$ is represented by the following formula (2):

$$\hat{L} = L_{CE} + \lambda_1 R_s(r) \qquad (2)$$

$L_{CE}$ is the cross entropy loss. $R_s(r)$ is the layer-wise polarization regularization term. $\lambda_1$ is a regularization parameter.

The cross entropy loss $L_{CE}$ may be determined by class labels of the training data.

The layer-wise polarization regularization term $R_s(r)$ is calculated by the following formulas (3)-(4):

$$R_s(r) = \sum_{l=1}^{L} \sum_{c=1}^{C_l} k \left| r_{l,c}^t \right| - \left| r_{l,c}^t - \overline{r_l} \right| \qquad (3)$$

$$\overline{r_l} = \sum_{c=1}^{C_l} r_{l,c}^t / C_l \qquad (4)$$

$R_s(r)$ is the layer-wise polarization regularization term, $$r_{l,c}^t$$

is the scaling factors, L is the number of layers of the batch normalization layer and the convolutional layer, $C_l$ is the number of channels of the convolutional kernels, and k is a regularization parameter.

In formula (4), the layer-wise polarization regularization term $R_s(r)$ can be used to reduce the number of activated neurons, in which $$\left| r_{l,c}^t \right|$$

represents the absolute value of the scaling factor $$r_{l,c}^t$$

for each channel in each batch normalization layer. The term $$\left| r_{l,c}^t \right|$$

makes each scaling factor $$r_{l,c}^t$$

approaches 0 after training. $\overline{r_l}$ is the average value of the layer-by-layer scaling factors $$r_{l,c}^t$$

in the neural network model NN. The term $$\left| r_{l,c}^t - \overline{r_l} \right|$$

drives all of the scaling factors $$r_{l,c}^t$$

to increase the gap between $\overline{r_l}$, that is, the scaling factors $$r_{l,c}^t$$

will have a polarization effect, thus resulting in the remarkable difference between importance and non-importance. The parameters k and $\lambda_1$ of formulas (2) and (3) can be adjusted according to different training data sets.

In the process of determining the backward propagation gradient for learning the new task t+1, the scaling factors $$\gamma_l^{t+1}$$

receive a gradient $g_l$ transmitted from an activation layer, and the training module 1205 determines whether a plurality of corresponding convolutional parameters are important and are to be activated according to the scaling factors $$\gamma_l^{t+1}.$$

If the scaling factor $$\gamma_l^{\le t}$$

corresponding to one of the t tasks where the training is already performed indicates high importance to the convolutional parameter at the same location, then act $$(\gamma_l^{\le t})$$

represents that the convolutional parameter is activated by the scaling factor corresponding to the task. The training module 1205 adjusts the backward propagation gradient $$g_l'$$

according to the activation parameters act(x). The training module 1205 updates the neural network model NN and the polarization mask (the scaling factor $$\gamma_i^{t+1}$$

of the task-specific layer corresponding to the new task t+1 according to the adjusted backward propagation gradient $$g_i'.$$

The adjusted backward propagation gradient is calculated by the following formula (5):

$$g_i' = (1 - \mathrm{act}(\gamma_i^{\leq t}))g_i, \; \begin{cases} \mathrm{act}(x) = 1 & \text{if } x \neq 0 \\ \mathrm{act}(x) = 0 & \text{if } x = 0 \end{cases} \quad (5)$$

wherein $$g_i'$$

is the adjusted backward propagation gradient, $g_i$ is the backward propagation gradient, $$\gamma_i^{\leq t}$$

is a cumulative maximum value of the scaling factors of different tasks corresponding to convolutional parameters at the same location, and $$\mathrm{act}(\gamma_i^{\leq t})$$

corresponds to the activation parameters determined by the cumulative maximum value $$\gamma_i^{\leq t}.$$

Figure 6B:
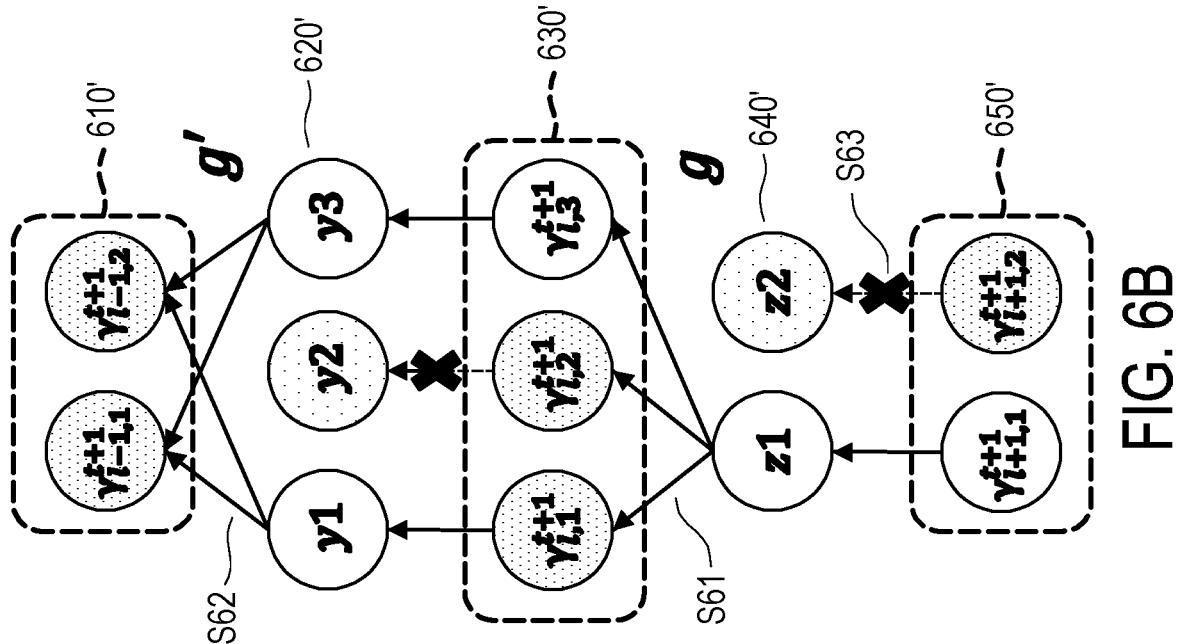
FIG. 6B is a schematic view of updating the neural network model NN and a polarization mask of a task-specific layer corresponding to a task according to the backward propagation gradient in an embodiment of the disclosure.

FIG. 6B is a schematic view of updating the neural network model NN and a polarization mask of a task-specific layer corresponding to a task according to the backward propagation gradient in an embodiment of the disclosure. With reference to FIG. 6B, the batch normalization layer 630' is taken as an example; in step S61, the batch normalization layer 630' obtains the backward propagation gradient g transmitted back by a neuron z1. In step S62, the training module 1205 determines a plurality of activation parameters act(x) according to the scaling factors $$\gamma_i^{t+1}$$

of the batch normalization layer 630' and adjusts the backward propagation gradient g and updates the scaling factors $$\gamma_i^{t+1}$$

of the batch normalization layer 610' and parameters of neurons y1 and y3 according to the adjusted backward propagation gradient g'.

When performing the backward propagation gradient for learning the new task t+1, the training module 1205 records the location of the activated scaling factors $$\gamma_i^{t+1}$$

for the t tasks on which the training has been performed. If the parameter of the corresponding convolutional layer is very important to a previous task, it is not expected to modify the parameter by the gradient corresponding to the new task; therefore, in the process of performing the backward propagation gradient for the new task, the important convolutional neurons are protected from being modified by the new task, which should however not pose any limitation to whether the polarization mask corresponding to the new task activate the neurons important to the previous task. Therefore, the convolutional kernels whose parameters are of high importance may be effectively used repeatedly by a plurality of tasks. For instance, the neurons y2 and z2 shown in FIG. 6B are the preserved convolutional neurons, and thus in the backward propagation gradient process of step S63, the parameters of the neurons y2 and z2 are not modified.

Figure 7:
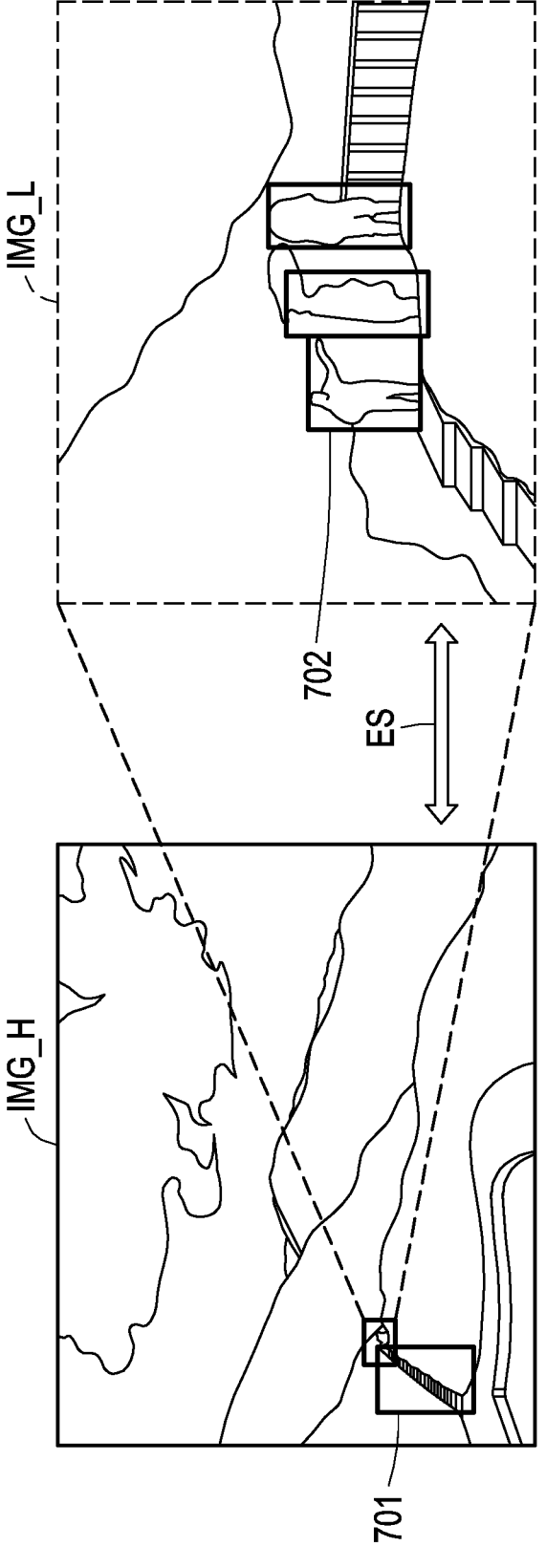
FIG. 7 is a schematic view of switching task mode of object detection according to an embodiment of the disclosure.

FIG. 7 is a schematic view of task mode switching of object detection in an embodiment of the disclosure. In the embodiment of the disclosure, the electronic device 10 is, for example, a drone. As shown in FIG. 7, the electronic device 10 can switch between a first task mode (corresponding to the image IMG_H) and a second task mode (corresponding to the image IMG_L) according to the change of the environment signal ES (which, for example, may include altitude of the drone in the environment). In one embodiment, the training module 1205 determines a second task mode according to the environment signal ES, and receives a second training data associated with the second task mode.

The training module 1205 configures a second task-specific layer of the neural network model according to the second task mode, wherein the second polarization mask of the second task-specific layer determines a second submodel of the neural network model. The training module 1205 updates the neural network model and the second polarization mask of the second task-specific layer according to the second training data.

For example, in an application scenario where an unmanned aerial vehicle (UAV) is used for search and rescue mission in mountainous areas, when the UAV flies at an altitude of over "50" meters, the objects representing pedestrians in the image IMG_H occupy only a small fraction of the entire frame due to the high altitude. This makes it difficult for object detection models or human eye to identify them. Therefore, when flying at high altitude, it is more appropriate to detect objects in larger areas where people are likely to gather, such as trails, pathways, or streams, resulting in object detection result 701.

Once the remotely controlled unmanned aerial vehicle (UAV) lowers its altitude to below "50" meters for intensive searching, the training module 1205 is notified of the change in environment signal ES (e.g., altitude), allowing it to switch task mode. At this point, the size of pedestrians in the image IMG_L becomes larger. The object detection model then identifies potential search and rescue targets as object detection outcome 702. It is important to note that regardless of high or low flying altitude, the UAV uses the same neural network model NN for training. However, different sub-models are used for inference based on the different task modes. In this search and rescue application scenario, if the UAV detects pedestrians, it can immediately provide relative GPS positions, images, or sound alerts. Before rescue personnel arrive at the scene, the UAV can remotely drop essential survival supplies, thereby prolonging the victims' survival time and achieving optimal operational efficiency of the remotely controlled UAV.

In one embodiment, the electronic device 10 may be an edge computing device. Additionally, during UAV flight, the images collected at different altitudes can be stored. After completing the flight mission and connecting to a stable power source, the edge computing device may train the images of each individual task to update sub-models. Due to the relatively small number of images for each task, the computational load and time required on the electronic device 10 are significantly reduced. Compared to traditional training methods, the embodiment of the disclosure enables faster updating of the neural network model NN. The use of edge computing device to update the model with newly added data in a short period of time and to perform inference in real-time greatly enhance the advantages of the edge computing device.

In summary, the embodiments of the disclosure provide an object detection method, a machine learning method and electronic device that allow multiple tasks to share a neural network model as a single-stage object detector. This reduces the overall network size and computational burden, meanwhile avoiding catastrophic forgetting without accessing and storing old task data. Thus, the object detection model retains the knowledge acquired from previously learned tasks and possesses the capability to learn new tasks continually.

It will be apparent to those skilled in the art that various modifications and variations may be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An object detection method, comprising:
detecting an environment signal;
determining a task mode according to the environment signal;
capturing an input image;
performing feature extraction on the input image according to the task mode through a sub-model of a neural network model, wherein the sub-model of the neural network model comprising a task-specific layer corresponding to the task mode, and a polarization mask of the task-specific layer determines the sub-model of the neural network model, wherein the neural network model comprising a feature extraction network, wherein the polarization mask of the task-specific layer comprising a plurality of scaling factors of a batch normalization layer of the feature extraction network, and the plurality of scaling factors are associated with a plurality of convolutional kernels of a convolutional layer of the feature extraction network, wherein the step of performing feature extraction on the input image according to the task mode through the sub-model of the neural network model comprising:
passing the input image through the feature extraction network to obtain an input feature map, further comprising:
passing the input image through the convolutional layer and obtaining the input feature map by performing normalization calculation based on the plurality of scaling factors of the batch normalization layer; and
outputting an object detection result corresponding to the task mode.

2. The object detection method of claim 1, wherein the feature extraction network comprising a backbone network and a neck network, wherein the step of passing the input image through the feature extraction network to obtain the input feature map comprising:
passing the input image through the backbone network to obtain a first feature map; and
passing the first feature map through the neck network to obtain the input feature map.

3. The object detection of claim 2, wherein the polarization mask of the task-specific layer comprising a plurality of first scaling factors of a first batch normalization layer of the backbone network and a plurality of second scaling factors of a second batch normalization layer of the neck network, wherein the plurality of first scaling factors are associated with a plurality of first convolutional kernels in a first convolutional layer of the backbone network, wherein the plurality of second scaling factors are associated with a plurality of second convolutional kernels in a second convolutional layer of the neck network, wherein the step of passing the input image through the feature extraction network to obtain the input feature map comprising:
passing the input image through the first convolutional layer and obtaining the first feature map by performing normalization calculation based on the plurality of first scaling factors of the first batch normalization layer; and
passing the first feature map through the second convolutional layer and obtaining the input feature map by performing normalization calculation based on the plurality of second scaling factors of the second batch normalization layer.

4. The object detection method of claim 1, wherein the neural network model further comprising a head network, wherein the step of outputting the object detection result corresponding to the task mode comprising:
passing the input feature map through the head network to obtain a prediction class and a bounding box of the input image.

5. The object detection method of claim 4, wherein the head network comprising a third batch normalization layer and a plurality of output layers, wherein the polarization mask of the task-specific layer comprising a plurality of third scaling factors of the third batch normalization layer, wherein the plurality of third scaling factors are associated with a plurality of third convolutional kernels in a third convolutional layer of the third batch normalization layer, wherein the step of passing the input feature map through the head network to obtain the prediction class and the bounding box of the input image comprising:
passing the input feature map through the third convolutional layer and obtaining an output feature map by performing normalization calculation based on the plurality of third scaling factors of the third batch normalization layer; and passing the output feature map through the plurality of output layers to obtain the prediction class and the bounding box.

6. The object detection method of claim 1, wherein the neural network model is a YOLOR model.

7. The object detection method of claim 1, further comprising:

receiving a training data associated with the task mode, wherein the training data comprising a training image, a class label corresponding to the training image and a bounding box corresponding to the training image;

configuring the task-specific layer of the neural network model according to the task mode;

determining a loss function according to the class label, the bounding box label and the polarization mask of the task-specific layer;

determining a backpropagation gradient according to the loss function; and updating the neural network model and the polarization mask of the task-specific layer according to the backpropagation gradient.

8. The object detection method of claim 7, wherein the loss function comprising:

a cross entropy loss; and a layer-wise polarization regularization term.

9. The object detection method of claim 8, wherein the polarization mask of the task-specific layer comprising a plurality of scaling factors of a batch normalization layer of the neural network model, and the plurality of scaling factors are associated with a plurality of convolutional kernels in a convolutional layer of the neural network model, wherein the layer-wise polarization regularization term is calculated by the following formula:

$$R_s(r) = \sum_{l=1}^{L} \sum_{c=1}^{C_l} k|r_{l,c}^t| - |r_{l,c}^t - \overline{r_l}|,$$

$$\overline{r_l} = \sum_{c=1}^{C_l} r_{l,c}^t / C_l,$$

wherein $R_s(r)$ represents the layer-wise polarization regularization term, $$r_{l,c}^t$$

represents the plurality of scaling factors, L represents a number of layers of the batch normalization layer and the convolutional layer, $C_l$ represents a number of channels of the convolutional kernels, and k is a parameter.

10. The object detection method of claim 7, wherein the step of updating the neural network model and the polarization mask of the task-specific layer according to the backpropagation gradient comprising:

determining activation parameters based on the polarization mask of the task-specific layer;

adjusting the backpropagation gradient according to the activation parameters; and updating the neural network model and the polarization mask of the task-specific layer according to the backpropagation gradient.

11. The object detection method of claim 7, further comprising:

determining a second task mode according to the environment signal and receiving a second training data associated with the second task mode;

configuring a second task-specific layer of the neural network model according to the second task mode, wherein a second polarization mask of the second task-specific layer determines a second sub-model of the neural network model; and updating the neural network model and the second polarization mask of the second task-specific layer according to the second training data.

12. An electronic device, comprising:

a storage medium, storing a plurality of modules; and a processor, coupled to the storage medium, configured to execute the plurality of modules, wherein the plurality of modules comprising:

an environment perception module, detecting an environment signal;

an image capturing module, capturing an input image; and an inference module, determining a task mode according to the environment signal, performing feature extraction on the input image according to the task mode through a sub-model of a neural network model, wherein the sub-model of the neural network model comprising a task-specific layer corresponding to the task mode, and a polarization mask of the task-specific layer determines the sub-model of the neural network model, wherein the neural network model comprising a feature extraction network, wherein the polarization mask of the task-specific layer comprising a plurality of scaling factors of a batch normalization layer of the feature extraction network, and the plurality of scaling factors are associated with a plurality of convolutional kernels of a convolutional layer of the feature extraction network;

passing the input image through the feature extraction network to obtain an input feature map;

passing the input image through the convolutional layer and obtaining the input feature map by performing normalization calculation based on the plurality of scaling factors of the batch normalization layer; and outputting an object detection result corresponding to the task mode.

* * * * *